Patented Dec. 23, 1930

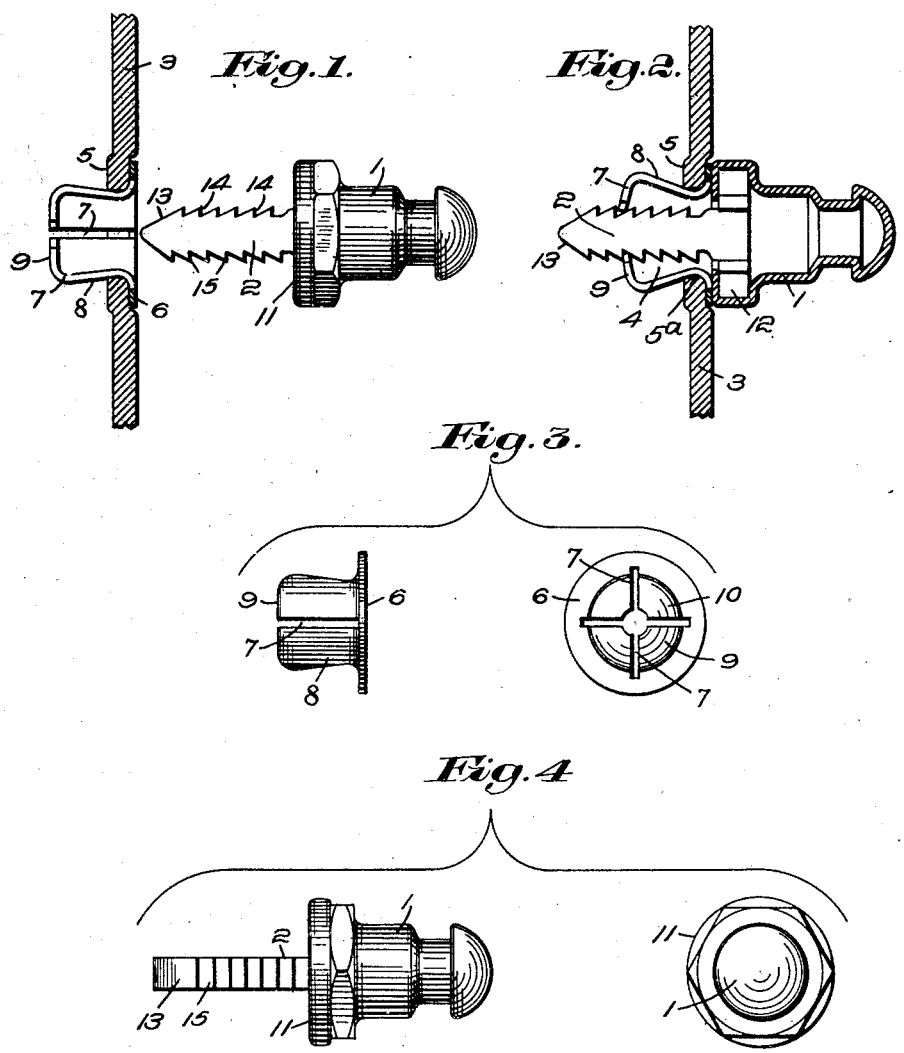

1,785,825

UNITED STATES PATENT OFFICE

MOSES F. CARR, OF LEXINGTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

FASTENING INSTALLATION

Application filed January 16, 1926, Serial No. 81,871. Renewed May 24, 1929.

This invention aims to provide improvements in fastening installations wherein a separable fastener element is secured to a rigid support.

In the drawings, which illustrate a preferred embodiment of my invention:—

Figure 1 is a view showing the support and resilient element in cross-section with the fastening element about to be secured thereto;

Fig. 2 is a section partly in elevation showing the separable fastener element secured to the support;

Fig. 3 includes a side and an end elevation of the resilient locking element; and Fig. 4 includes a side and an end elevation of a preferred form of stud element.

Referring to the drawings, I have illustrated a simple and effective manner of installing a member of a separable fastener to a relatively thin rigid support. The installation shown includes a stud member 1, which may be of any suitable construction, an attaching element 2 forming part of the stud unit, a support 3 which may be of wood, sheet metal or any rigid material, and a resilient locking element 4 for cooperating with the attaching element 2 to provide means for securing the stud to the support.

The support 3 may be the sheet metal side of a vehicle body and is provided with a depressed portion 5 in which is formed an aperture 5a, as shown in Figs. 1 and 2.

The resilient locking element 4 is pressed from a single piece of metal and has a base 6 from which arises a resilient portion slightly larger in diameter at the outer end than at the end adjacent to the base. Resiliency is provided by slits 7 which divide the resilient portion into contractible and expansible fingers 8 having inbent extensions 9 terminating about an aperture 10 in the end of the resilient portion, as shown in Figs. 1 and 3.

The stud member illustrated is pressed from a single piece of metal and has a base 11 which encloses the head 12 of the attaching element 2 to secure the two parts together. The element 2 may be of any suitable shape which will engage and lock with the free ends of the inbent portions 9 either by turning or by a straight push of the stud relative thereto. However, I have shown a fastening element pressed from a single piece of metal and having a narrow shank portion provided with a tapered end 13. The opposed narrow edges are provided with notches 14. The notches of one edge are preferably staggered relative to the notches of the other edge. The teeth 15 between the notches are preferably shaped like ratchet teeth so that they may pass between the inbent portions 9 by a straight push on the stud, but locked against movement by a pull in the reverse direction.

In assembling the stud 1 with the support 3, the locking element 4 is first engaged with the support by snapping the enlarged portion of the fingers 8 through the aperture 5a. The base 6 of the locking element fits into the depression 5 (Fig. 1) and lies flush with the outer surface of the support 3. The stud may be easily and quickly secured in place by pressing it toward the locking element 4 so that the tapered end of the attaching element 2 may enter the aperture 10 and engage the inbent portions 9. As the element 2 is forced between the inbent portions 9, the fingers 8 are expanded about the inner edge of the wall surrounding the aperture 5a and are held expanded so that the locking element 4 cannot be pulled free from the support 3. The stud should be pushed toward the support until the base 11 of the stud seats against the base 6 of the locking element 4, thereby concealing it. When the stud is thus secured to the support, the free ends of the inbent portions 9 enter the notches and prevent separation of the stud from the support when an outward pull is exerted thereupon, as when a socket is being disengaged from the stud.

The point at which the ends of the inbent portions 9 engage the attaching element 2 is preferably at a substantial distance from the inner face of the support 3, thereby to assist in holding the stud rigid as shown in Fig. 2.

By arranging the notches so that they are staggered on opposite edges, they act as a sort of thread and permit separation of the stud from the support by turning the stud relative thereto, thereby permitting the attaching element 2 to be unscrewed from the locking element 4.

Instead of providing the element 2 with notches, I may provide a screw threaded portion. Furthermore the same fastening means may be used to secure a socket to a support as well as a stud.

While I have shown and described a preferred embodiment of my invention, it will be understood that changes involving omission, substitution, alteration and reversal of parts, and even changes in the mode of operation, may be made without departing from the scope of my invention, which is best defined in the following claims.

Claims:

1. In a snap fastener installation, a support presenting an aperture, a contractible and expansible part entered into said aperture and a separable snap fastener element having means for cooperative separable engagement with and disengagement from another snap fastener element by movement toward and away from each other, said snap fastener element having an attaching portion for engagement with said contractible and expansible part to expand and lock it to said support by direct axial movement relative to the contractible and expansible part and interlocking means between the attaching portion and said part for holding said fastener element in position against said support.

2. In a snap fastener installation, a rigid support, a contractible and expansible part snapped through an aperture in said support and presenting at its inner end a plurality of inwardly bent portions surrounding an aperture, a separable fastener stud having means for separable fastening engagement with and disengagement from a cooperating snap fastener socket by movement toward and away from each other, said fastener stud having an attaching portion adapted to be forced between said inwardly bent portions by direct axial movement to expand and lock said part to the support and a series of notches presented by said attaching portion for receiving the ends of said inwardly bent portions to secure the stud in assembly with the support through said contractible and expansible part.

3. In a snap fastener installation, a snap fastener stud member having means for separable fastening engagement with and disengagement from a cooperating fastener socket by movement toward and away from each other, said stud member having an attaching element extending therefrom, a stud support, locking means attached to the stud support and having resilient finger portions presented at the inner side of the stud support for receiving said attaching element to secure the said stud member to said stud support and said attaching element presenting thread-like interlocking means for engagement with the free ends of the said finger portions to permit engagement of the attaching element therewith by axial movement relative thereto while permitting the stud to be separated therefrom by rotation of the stud member relative thereto to disengage the attaching element.

4. In a snap fastener installation, a support presenting an aperture surrounded by a wall, a snap fastener stud unit having a head and a neck for snap fastening engagement with and disengagement from a cooperating snap fastener socket by movement toward and away from each other, laterally expansible means extending through the aperture in the support and means provided as a part of the stud unit and adapted to expand the expansible means against the wall surrounding the aperture in the support by direct axial movement relative to the expansible means thereby to secure the stud unit in fixed relation to the support.

5. In a snap fastener installation, a support presenting an aperture surrounded by a wall, a snap fastener stud unit having a head and a neck for snap fastening engagement with and disengagement from a cooperating snap fastener socket by movement toward and away from each other, a base, a generally cup-shaped attaching portion extending from adjacent to the base through the aperture in the support, said cup-shaped attaching portion having a number of laterally yieldable fingers and means provided as a part of the stud unit and adapted to be pressed toward the bottom of the cup-shaped portion thereby to expand said fingers and secure the stud unit in fixed relation to the support.

In testimony whereof, I have signed my name to this specification.

MOSES F. CARR.